Patented Feb. 7, 1928.

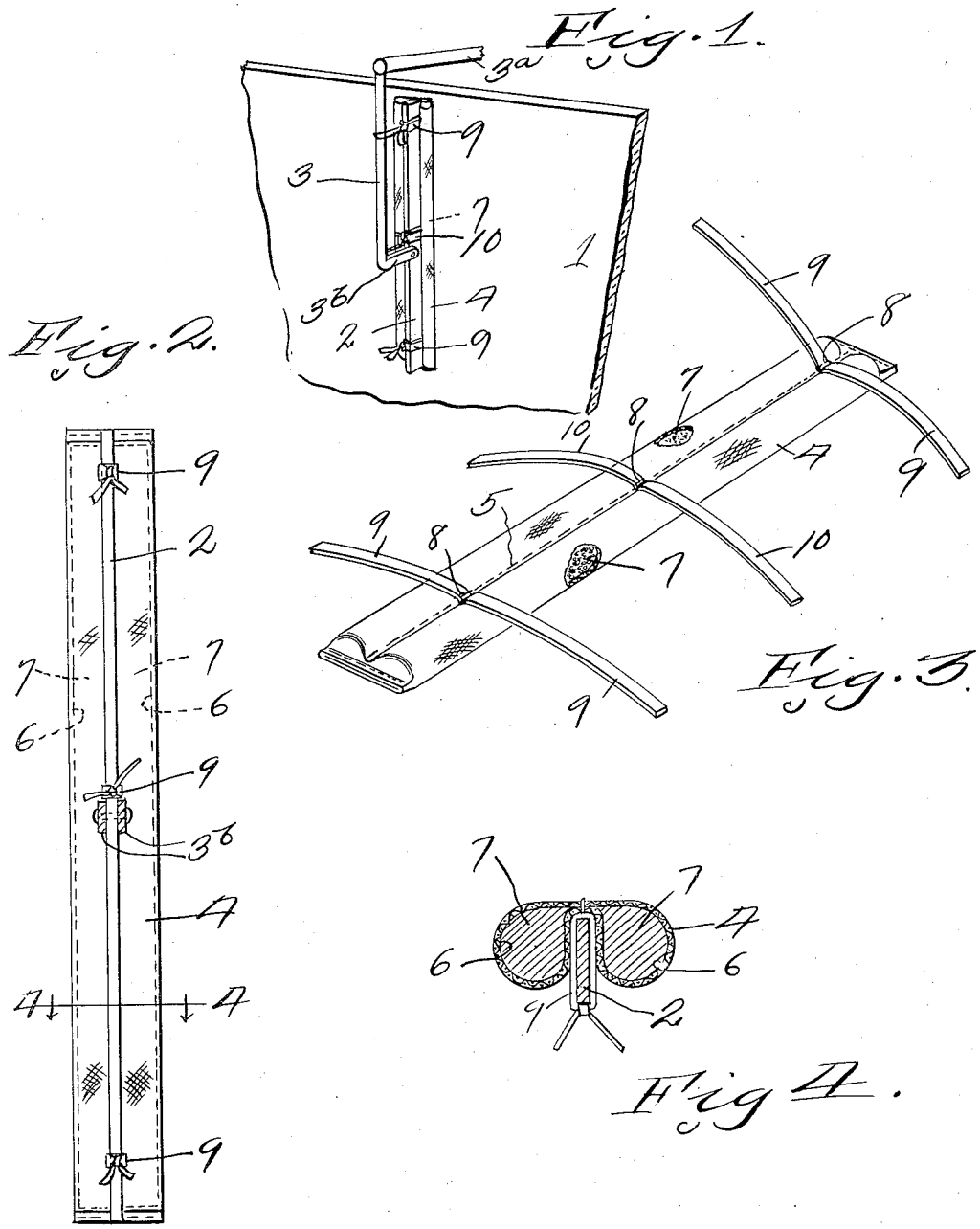

1,658,101

UNITED STATES PATENT OFFICE.

WILLIAM E. SEVEKE, OF MAYWOOD, NEBRASKA.

WINDSHIELD WIPER.

Application filed March 23, 1927. Serial No. 177,617.

The invention relates to windshield wipers, and has for its object to provide in combination with the glass engaging wiping arm means whereby a member having a chemical therein which will prevent condensation on the windshield and formation of ice.

A further object is to provide the glass wiping arm with a fabric container detachably connected thereto, in which container is placed a chemical compound which will act on the glass or windshield during the movement of the wiper and prevent condensation and formation of ice. The chemical compound preferably comprises a mixture of salt saturated with glycerin, and anis oil, which oil and glycerin cooperate with the salt causing the moisture to be thrown off and simultaneously spreading a moisture having an oil therein, thereby preventing freezing of water on the windshield.

A further object is to form the device from fabric having longitudinally disposed chambers therein and flexible members connected to one side thereof for extending around the wiper when the wiper is disposed between the sections of the device, thereby detachably connecting the device to the wiper.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a perspective view of the device showing the same attached to a swinging arm of a conventional form of windshield wiper.

Figure 2 is an enlarged front elevation of the windshield wiper and attachment applied thereto.

Figure 3 is a perspective view of the device.

Figure 4 is a horizontal sectional view taken on line 4—4 of Figure 2.

Referring to the drawing the numeral 1 designates a conventional form of windshield glass and 2 the wiper bar which is carried by the arm 3, of the shaft $3^a$, and which wiper bar swings on its pivotal point in the usual manner. It has been found that windshield wipers do not work efficiently, particularly they do not prevent the formation of ice on the windshield in very cold weather, and to obviate this difficulty the present device is designed, and which device comprises an elongated fabric container 4, which is provided with longitudinal stitching 5, thereby dividing the same into compartments 6 extending the full length of the device, and in which compartments a chemical compound is placed, which will give off chemicals in the form of a moisture of liquid onto the glass. The chemicals are preferably a mixture of salt saturated with glycerin and anis oil, and which chemical compound is designated by the numeral 7. It will be noted by stitching the container longitudinally that connected elongated cylindrical members are provided, between which the wiper arm 2 is disposed, therefore it will be seen that when the arm 2 swings, said cylindrical members will engage the glass, consequently moisture from the chemical will be deposited on the glass. One side of the container has secured thereto by stitching at 8 flexible members 9 and 10. The flexible members 9 extend around the outer side of the wiper member 2 and are tied together, while the member 10 extends up over the arm $3^b$ and is secured thereto and forms means for preventing downward displacement of the device on the wiper arm 2, therefore it will be seen that the device may be easily and quickly applied to windshield wipers now in use without modifying the construction thereof.

From the above it will be seen that a windshield wiper attachment is provided for the reception of a chemical compound which attachment may be easily and quickly applied to the windshield wiper without varying the construction thereof, and by forming the device from elongated cylindrical members adapted to be disposed on opposite sides of the windshield wiper arm, it is obvious that chemicals will be deposited on the windshield from either cylindrical member according to the direction of the swing of the arm, and at the same time a compact structure is provided which will not give a bulky appearance and one which may be cheaply manufactured and sold.

The invention having been set forth what is claimed as new and useful is:—

The combination with a windshield wiper arm, of a chemical carrying container carried by said arm, said container being formed from a tubular porous material, said formed from a tubular porous material, said porous material being longitudinally portions, said windshield wiper being disposed between the adjacent sides of said cylindrical portions and means carried by said container connecting it to the windshield wiper.

In testimony whereof I hereunto affix my signature.

WILLIAM E. SEVEKE.